United States Patent [19]

Knight

[11] 4,254,365
[45] Mar. 3, 1981

[54] SIDE PINCUSHION CORRECTION MODULATOR CIRCUIT

[75] Inventor: Peter R. Knight, Indianapolis, Ind.

[73] Assignee: RCA Corporation, New York, N.Y.

[21] Appl. No.: 80,840

[22] Filed: Oct. 1, 1979

[51] Int. Cl.³ ............................................. H01J 29/70
[52] U.S. Cl. .................................................. 315/371
[58] Field of Search .............................. 315/370, 371

[56] References Cited

U.S. PATENT DOCUMENTS

| | | | |
|---|---|---|---|
| 3,906,305 | 9/1975 | Nillesen | 315/399 |
| 3,962,602 | 6/1976 | Dietz | 315/371 X |
| 3,968,402 | 7/1976 | Sahara et al. | 315/370 |
| 4,006,385 | 2/1977 | Onodera | 315/370 X |
| 4,063,134 | 12/1977 | Iida | 315/371 |
| 4,140,949 | 2/1979 | Terry | 315/371 |
| 4,179,642 | 12/1979 | den Hollander | 315/370 |

OTHER PUBLICATIONS

Television Service Manual, 9000 Series Colour, Thorn Consumer Electronics Service Division, Nov. 1975, p. 19, & the Electrical Schematic of the 9000 Series Color Television Receiver.

*Primary Examiner*—Malcolm F. Hubler
*Attorney, Agent, or Firm*—Eugene M. Whitacre; William H. Meagher; Joseph J. Laks

[57] ABSTRACT

A side pincushion corrected deflection circuit for a television receiver includes a deflection winding, a trace capacitor and a first switch for generating scanning current in the deflection winding. A modulator circuit includes a modulator inductor, a modulator capacitance and a second switch for generating a sawtooth modulator current in the inductor. The trace and modulator capacitors are charged from a voltage source through a flyback transformer winding. Reflected load currents from other television receiver circuits also flow in the flyback transformer winding. A transistor stage in the modulator circuit shunts current away from the modulator capacitor to control the modulator and trace capacitor voltages. A vertical rate bias voltage is applied to the transistor stage and varies the shunt current at the vertical rate to provide side pincushion correction. The transistor stage is operated in an open loop manner with no voltage feedback of the modulator capacitor voltage. An additional bias voltage, representative of the load current flowing in the flyback transformer, is applied to the transistor stage in order to reduce undesirable load current modulation of the side pincushion correction.

5 Claims, 1 Drawing Figure

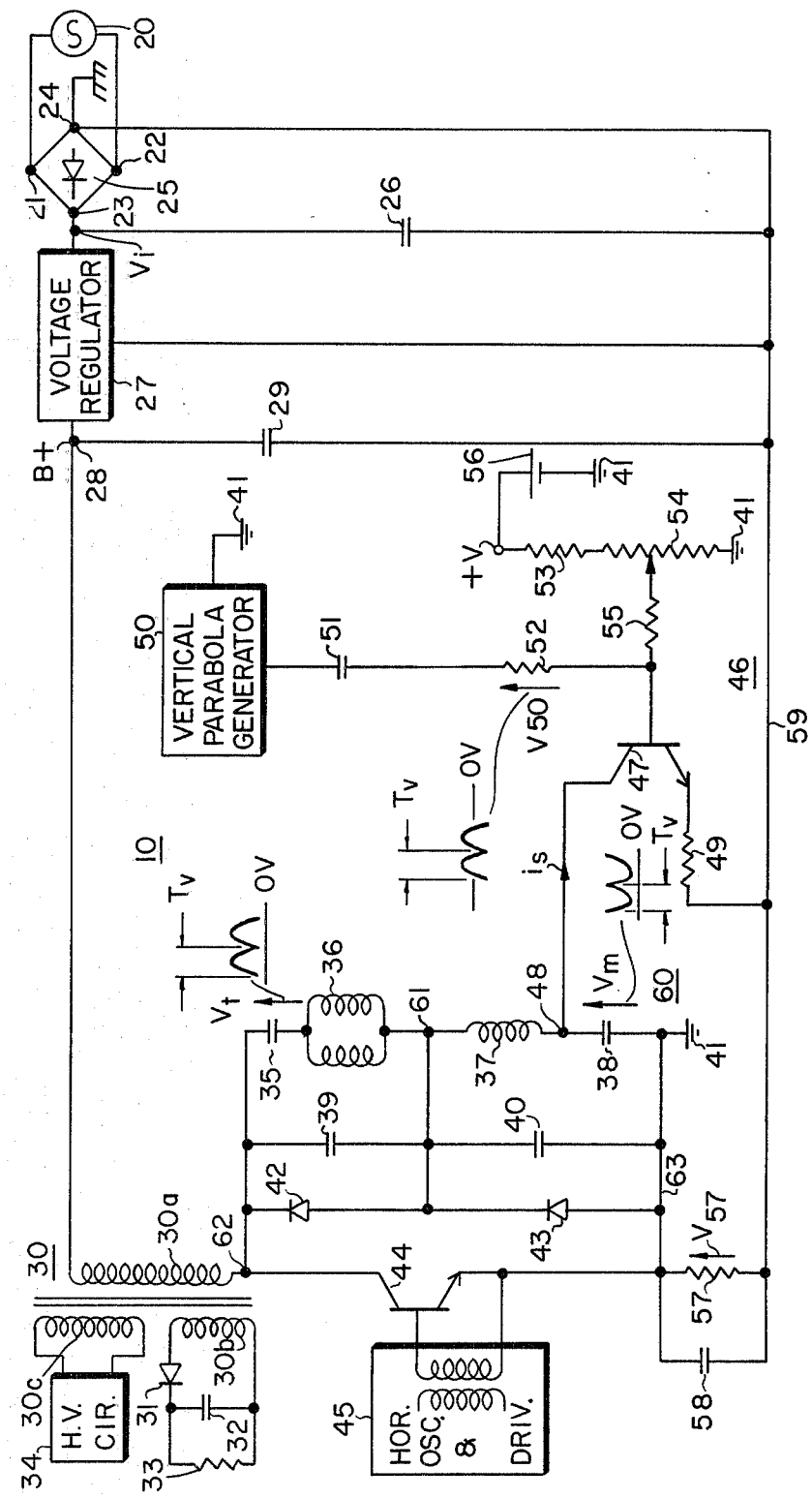

SIDE PINCUSHION CORRECTION MODULATOR CIRCUIT

BACKGROUND OF THE INVENTION

This invention relates to side pincushion correction for a deflection circuit.

In a television receiver, the electron beams traveling inside the television receiver picture tube are deflected by the magnetic fields generated by sawtooth deflection currents flowing in horizontal and vertical deflection windings. The deflected electron beams scan a raster pattern on the picture tube phosphor screen. The raster pattern, without correction, may display various geometric distortions, such as side or east-west pincushion distortion and top and bottom or north-south pincushion distortion.

To correct side pincushion distortion, the peak-to-peak horizontal deflection trace current flowing in the horizontal deflection winding is modulated at a vertical rate in a parabolic manner. For large deflection angle picture tubes, such as 100° or 110° deflection angle picture tubes, such parabolic modulation is accomplished by a modulator circuit, such as a diode modulator, coupled to the horizontal deflection winding.

In a typical diode modulator circuit, the deflection trace capacitor is coupled to the deflection winding, and a modulator inductor is coupled to a modulator capacitor. The two capacitors are serially coupled to and charged from a B+ voltage supply through a flyback transformer primary winding. A deflection switch and modulator switch are provided in order to generate horizontal rate sawtooth currents in the deflection winding and in the modulator inductor. During horizontal retrace, the horizontal deflection winding and the modulator inductor resonate with retrace capacitors for providing flyback of the sawtooth currents.

A modulator control circuit coupled to the modulator capacitor varies the voltage across the capacitor at a vertical rate in a parabolic manner. As a result, the trace voltage across the trace capacitor will vary in a similar manner, thereby providing side pincushion raster correction.

With the flyback transformer primary winding coupled in the charging path of the trace and modulator capacitors, variations in loading by circuits magnetically coupled to the primary winding may undesirably modulate the trace and modulator capacitor voltages. The modulator control circuit should be designed to respond to these load variations in a manner which will substantially reduce the undesirable load current modulation.

SUMMARY OF THE INVENTION

A trace capacitance and a first switch apply a trace voltage to a deflection winding for generating a deflection trace current. A modulator capacitance and a second switch apply a modulator voltage to a modulator inductance for generating a sawtooth modulator current. A flyback transformer winding coupled to a source of operating voltage and to the trace and modulator capacitances charges the capacitances to develop the trace and modulator voltages. A controllable shunting stage coupled to one of the trace and modulator capacitances and responsive to bias voltages develops a shunt current in order to control the trace and modulator voltages. The stage is open loop operated with respect to feeding back a bias voltage from the one capacitance. A vertical rate bias voltage is applied to the shunting stage for varying the shunt current at a vertical rate in order to provide side pincushion correction. An additional bias voltage representative of load current flowing in the flyback transformer is applied to the shunting stage for reducing undesirable load current modulation of the side pincushion correction.

BRIEF DESCRIPTION OF THE DRAWING

The FIGURE illustrates a deflection circuit with modulator side pincushion correction embodying the invention.

DESCRIPTION OF THE INVENTION

In a horizontal deflection circuit 10, illustrated in the FIGURE, a source of alternating current power line voltage 20 is coupled between terminals 21 and 22 of a fullwave bridge rectifier 25. Coupled across output terminals 23 and 24 of rectifier 25 is a filter capacitor 26, with terminal 24 functioning as a common current return terminal for current flowing out of terminal 23. A filtered but unregulated input voltage $V_i$ is developed across terminals 23 and 24. The input voltage $V_i$ is applied to a voltage regulator 27, which may be of conventional design, for developing a regulated B+ voltage at an input terminal 28 of horizontal deflection circuit 10. Filtering for the B+ voltage is provided by a capacitor 29 coupled across terminal 28 and common current return terminal 24.

The B+ voltage is applied to a terminal of primary winding 30a of a horizontal output or flyback transformer 30. The other terminal of primary winding 30a is coupled to the collector of a horizontal output transistor 44 and to the series arrangement of an S-shaping or trace capacitor 35 and a horizontal deflection winding 36 at a terminal 62. A deflection retrace capacitor 39 and a damper diode 42 parallel the series arrangement of trace capacitor 35 and horizontal deflection winding 36.

A diode modulator circuit 60 is coupled to horizontal deflection winding 36 for providing side pincushion correction. Diode modulator 60 includes a series arrangement of a modulator indicator 37 and a modulator capacitor 38, with modulator inductor 37 coupled to horizontal deflection winding 36 at a terminal 61. Paralleling the series arrangement of inductor 37 and capacitor 38 is a modulator retrace capacitor 40 and a second switch or diode 43.

The emitter of horizontal output transistor 44, the anode of diode 43, a terminal of capacitor 40 and a terminal of capacitor 38 are coupled together at a terminal 41 along a common conductor line 63. Terminal 41 may be considered as a common terminal into which components of the currents flowing in horizontal deflection winding 36 and modulator inductor 37 flow. Terminal 41 may therefore, for convenience, be identified as a chassis ground, as this terminal may also be used as a common current return terminal for other television receiver circuits.

Trace capacitor 35 and modulator capacitor 38 are charged from the B+ supply through flyback transformer primary winding 30a, thereby establishing a trace voltage $V_t$ across capacitor 35 and a modulator voltage $V_m$ across capacitor 38. By means of the deflection switching elements, damper diode 42 and horizontal output transistor 44, and by means of the modulator switching element, diode 43, terminals 41, 61 and 62 are connected together during the entire horizontal trace interval. Thus, during horizontal trace, the trace voltage $V_t$ is applied across horizontal deflection winding 36 and the modulator voltage $V_m$ is applied across inductor 37 to produce a sawtooth horizontal deflection current in horizontal deflection winding 36 and a horizontal sawtooth modulator current in inductor 37.

During the first portion of horizontal trace, diodes 42 and 43 conduct the horizontal trace current in horizontal deflection winding 36 and the sawtooth modulator current in inductor 37. Towards the center of horizontal trace, a turn-on drive signal is applied across the base and emitter electrodes of horizontal output transistor 44 by a conventional horizontal oscillator and driver circuit 45. During the latter portions of horizontal trace, horizontal output transistor 44 and one of damper diode 42 and diode 43 conducts components of the horizontal trace current and the modulator current. If the horizontal trace current, for example, is the larger, then it is diode 43 which conducts components of the currents flowing in horizontal deflection winding 36 and inductor 37.

A modulator control circuit 46 varies the voltage $V_m$ across modulator capacitor 38 at a vertical rate in a parabolic manner as illustrated in the FIGURE. The trace voltage $V_t$ across capacitor 35 will therefore also vary at a vertical rate in a complementary parabolic manner, causing the peak-to-peak horizontal trace current to vary at a vertical rate in a parabolic manner, thereby providing side pincushion correction.

Modulator control circuit 46 includes a shunt transistor 47 coupled to a junction terminal 48 of inductor 37 and capacitor 38. Shunt transistor 47 is arranged in a common-emitter configuration, thereby functioning as a high impedance current drain for current flowing into terminal 48. By diverting current from modulator capacitor 38, shunt transistor 47 controls the modulator voltage $V_m$ established across the capacitor. Increasing the shunt current $i_s$, for example, will cause capacitor 38 to discharge and establish a lower voltage $V_m$ across the capacitor.

By varying the shunt current $i_s$ at a vertical rate in a parabolic manner, the modulator voltage $V_m$ and, thus, the trace voltage $V_t$, will also vary at a vertical rate in a parabolic manner, as is required for side pincushion correction. Modulation of the shunt current $i_s$ at a vertical rate is accomplished by modulating the base current to shunt transistor 47. A conventional vertical parabolic generator 50 AC couples a voltage $V_{50}$ to the base of transistor 47 through a capacitor 51 and a resistor 52, with the voltage $V_{50}$ varying at a vertical rate in a parabolic manner as illustrated in the FIGURE. A DC bias voltage is applied to the base of transistor 47 from a $+V$ voltage source through resistors 53–55 with resistor 55 being coupled to a wiper arm of resistor 54. Wiper arm 54 may be adjusted to provide raster width control. The emitter of transistor 47 is returned to chassis ground terminal 41 through a resistor 49 and a resistor 57. The voltages applied to the base of transistor 47 from vertical parabolic generator 50 and the $+V$ voltage source are all referenced with respect to chassis ground terminal 41 as illustrated in the FIGURE. Although the $+V$ source is illustrated as a battery 56, the $+V$ voltage may alternatively be derived by rectifying the voltage across a secondary winding of flyback transformer 30, not illustrated in the FIGURE.

Flyback transformer 30 may provide supply voltages to various ones of the television receiver circuits. For example, the voltage across a flyback transformer secondary winding 30b may be rectified by a diode 31 and filtered by a capacitor 32 to provide a supply voltage for a load circuit such as a vertical deflection circuit or an audio circuit and generally illustrated in the FIGURE as a resistor 33. A high voltage winding 30c may be coupled to a conventional high voltage circuit 34 to provide a high voltage or ultor accelerating potential. All of these circuits, magnetically coupled to flyback transformer winding 30a, draw a reflected load current from input terminal 28 through the primary winding.

As mentioned previously, modulator capacitor 38 is charged from the B+ supply at terminal 28 through flyback transformer primary winding 30a. The voltage level to which capacitor 38 is charged is a function of the current flowing in primary winding 30a. A greater current magnitude flowing in flyback transformer primary winding 30a will result in capacitor 38 being charged to a greater voltage level.

Because the current in primary winding 30a is not constant, but varies with loading variations on secondary windings 30b and 30c, the voltage level to which capacitor 38 is charged will also vary. Thus, the parabolic voltage component of $V_m$ produced by shunt current $i_s$ will be superimposed on a varying DC level, the DC level being a function of the load current flowing in primary winding 30a. For example, should the beam current requirements of high voltage circuit 34 increase, the reflected load current component flowing in primary winding 30a will increase, causing an increased charging of modulator capacitor 38. The trace voltage $V_t$ is reduced, thereby causing raster width distortion.

To correct for raster width distortion produced by variations in the load current flowing in flyback transformer primary winding 30a, the shunt current $i_s$ of diode modulator circuit 60 is made to follow the load current variations. When the load current increases, so does the shunt current, $i_s$, and similarly, when the load current decreases, the shunt current $i_s$ will also decrease. Thus, changes in the load current magnitude will result in changes in the shunt current magnitude rather than changes in the modulator capacitor voltage.

To vary the current shunted by the high impedance current drain device, transistor 47, the bias on transistor 47 is made to follow load current changes. The junction of resistors 49 and 57 is coupled to common current return terminal 24 along a conductor line 59. The DC load current path from terminal 28 and source 20 is through flyback transformer primary winding 30a and the collector-to-emitter path of horizontal output transistor 44. The current return path for the load current is through offset resistor 57 and conductor line 59 to the common current return terminal 24 of source 20.

An offset voltage $V_{57}$, filtered by a capacitor 58, is developed across offset resistor 57. The offset voltage varies directly with beam current and other flyback transformer variations. The offset voltage $V_{57}$ is applied to the emitter of shunt transistor 47 through resistor 49. The current $i_s$ thus varies directly with load current variations, as is required in order to reduce undesirable load current modulation of the modulator and trace voltages $V_m$ and $V_t$. Load current derived raster width distortion is reduced.

By coupling an impedance, such as resistor 57, between the common current return line 59 for the load current and the common current return line 63 for the modulator and horizontal deflection currents, these two current return lines are offset by a voltage representative of the load current. The biasing of shunt transistor 47 is referenced to common current return line 63. Thus, by coupling the offset impedance to a control electrode, i.e., the emitter of transistor 47, an additional bias voltage is provided which varies in a sense that will oppose undesired load current modulation of the side pincushion correction.

The voltage $V_m$ across modulator capacitor 38 is established by a charging current obtained through flyback transformer primary winding 30a. Modulator control circuit 46 need only generate a parabolically varying shunt current $i_s$, in an open loop arrangement, in order to parabolically modulate the modulator voltage $V_m$. Such shunt current may therefore be generated using only a single high impedance transistor stage operated in a common-emitter configuration as illustrated in the FIGURE.

The modulator control circuit need not use a low impedance emitter-follower stage coupled to modulator capacitor 38 as is required in some prior art circuits. Such an emitter-follower stage typically requires closed loop operation with the modulator voltage $V_m$ being compared to a parabolically varying reference voltage. Several additional stages of voltage amplification may then be required in the emitter-follower modulator configuration in order to generate the correct magnitude shunt current $i_s$.

The high impedance control circuit 46 of the FIGURE uses only a single transistor stage that is operated in a common-emitter configuration for providing high gain. Only open loop operation is provided. No voltage feedback of the modulator voltage $V_m$ is required. The parabolic voltage developed by generator 50 and the offset voltage $V_{57}$ developed across resistor 57, independently of the modulator capacitor voltage, are applied to the base and emitter electrodes of transistor 47 in order to provide side pincushion correction without undesirable load current modulation.

I claim:

1. A deflection circuit with side pincushion correction, comprising:
    a deflection winding;
    a trace capacitance coupled to said deflection winding;
    first switching means for applying a trace voltage to said deflection winding for generating a deflection trace current in said deflection winding;
    a modulator inductance;
    a modulator capacitance coupled to said modulator inductance;
    second switching means for applying a modulator voltage to said modulator inductance for generating a sawtooth modulator current in said modulator inductance;
    a source of operating voltage;
    means including a flyback transformer winding coupled to said source of operating voltage for charging said trace and modulator capacitances to develop said trace and modulator voltages;
    controllable shunting means coupled to one of said trace capacitance and said modulator capacitance and responsive to bias voltages for developing a shunt current to control said trace and modulator voltages;
    means for applying to said controllable shunting means a vertical rate bias voltage for varying said shunt current at a vertical rate to provide side pincushion correction;
    means independent of said one capacitance for developing a voltage representative of variations of load current flowing in said flyback transformer winding; and
    means for applying said load current variation representative voltage to said controllable shunting means as an additional bias voltage varying in a sense that opposes undesired load current modulation of said side pincushion correction.

2. A circuit according to claim 1 wherein said load current flows from said source of operating voltage and wherein the DC current path for said load current originates at a first terminal of said source of operating voltage, and continues through said flyback transformer winding and said first switching means to return to said source of operating voltage at a common current return terminal of said source.

3. A circuit according to claim 2 wherein said voltage developing means comprises an impedance through which said load current flows, with a first terminal of said impedance connected to said common current return terminal of said source of operating voltage and a second terminal of said impedance coupled to said first switching means.

4. A circuit according to claim 3 wherein said first terminal of said impedance is coupled to said controllable shunting means and said second terminal of said impedance is connected to a ground reference terminal for current components flowing in said horizontal deflection winding and said modulator inductance.

5. A modulator side pincushion corrected deflection circuit, comprising:
    a deflection winding;
    a trace capacitance coupled to said deflection winding;
    a modulator inductance coupled to said deflection winding;
    a modulator capacitor coupled to said modulator inductance;
    first switching means coupled to said deflection winding and to a first conductor line for applying the voltage developed in said trace capacitor across said deflection winding in order to generate scanning current in said deflection winding;
    second switching means coupled to said modulator inductance and to said first conductor line for applying the voltage developed in said modulator capacitance across said modulator inductance for generating a sawtooth modulator current in said modulator inductance, said first conductor line providing a common current path for current components of said scanning current and of said sawtooth modulator current;
    a voltage source for providing load current to a load circuit, with said load current flowing to said load circuit from a first terminal of said voltage source and with said load current returning from said load circuit to a second terminal of said voltage source along a second conductor line;
    an offset impedance coupled between said first and second conductor lines, said load current flowing in said offset impedance;
    a flyback transformer coupled to said first terminal of said voltage source and to said trace and modulator capacitances for charging said trace and modulator capacitances from said voltage source, with load circuits magnetically coupled to said flyback transformer drawing load current from said voltage source;

a control device coupled to one of said trace and modulator capacitances and responsive to bias signals for controllably diverting current from said one capacitance to control the voltages developed in said trace and modulator capacitances;

means for coupling to said control device a vertical rate bias signal for varying the voltages in said trace and modulator capacitances at a vertical rate to provide side pincushion correction; and means for coupling said offset impedance to said control device for providing a flyback transformer load current representative bias signal thereto to reduce undesirable load current modulation of the voltages developed in said trace and modulator capacitances.

* * * * *

UNITED STATES PATENT AND TRADEMARK OFFICE
CERTIFICATE OF CORRECTION

PATENT NO. : 4,254,365
DATED : March 3, 1981
INVENTOR(S) : Peter R. Knight

It is certified that error appears in the above-identified patent and that said Letters Patent is hereby corrected as shown below:

Col. 2, line 43, "indicator 37" should read -- inductor 37 --. Col. 6, line 39, "capacitor" should read -- capacitance --.

Signed and Sealed this

Twenty-ninth Day of September 1981

[SEAL]

Attest:

Attesting Officer

GERALD J. MOSSINGHOFF

Commissioner of Patents and Trademarks